United States Patent [19]

Gudorf

[11] 4,195,304

[45] Mar. 25, 1980

[54] CHARGE PLATE AND METHOD OF MANUFACTURE

[75] Inventor: James L. Gudorf, Dayton, Ohio

[73] Assignee: The Mead Corporation, Dayton, Ohio

[21] Appl. No.: 912,495

[22] Filed: Jun. 5, 1978

[51] Int. Cl.[2] .......... G01D 15/18

[52] U.S. Cl. .......... 346/75

[58] Field of Search .......... 346/75

[56] References Cited

U.S. PATENT DOCUMENTS

| | | | |
|---|---|---|---|
| 2,781,549 | 2/1957 | Milne | 18/47.5 |
| 3,552,004 | 1/1971 | Hagelbarger et al. | 29/423 |
| 3,586,907 | 6/1971 | Beam et al. | 346/75 X |
| 3,975,741 | 8/1976 | Solyst | 346/75 |

OTHER PUBLICATIONS

Hochberg, F., Fabricating Uniform Multinozzles for Ink Jet Printing, IBM Technical Diclosure Bulletin, vol. 15, No. 9, Feb. 1973, pp. 2845–2846.

*Primary Examiner*—George H. Miller, Jr.
*Attorney, Agent, or Firm*—Beibel, French & Nauman

[57] ABSTRACT

A charge plate for an ink jet printer comprises a rigid support plate provided with a medially extending elongated slot and an electrode support structure cast in place adheringly against the walls of the slot. The electrode support structure is fabricated from a non-conductive casting resin which is cast against a silicone elastomer mold having a series of upstanding pegs coated with a release agent and an overcoating of conductive epoxy. The casting resin flows around the peg structure and bonds itself to the conductive epoxy coating. The conductive epoxy material transfers from the mold surface to the electrode support structure upon mold separation, so that the casting process produces a series of cylindrical charging electrodes cast in place within charging tunnels in the electrode support structure. The resulting product is subjected to a finishing operation, and flexible printed circuit leads are thereafter attached to the charging electrodes.

6 Claims, 14 Drawing Figures

CHARGE PLATE AND METHOD OF MANUFACTURE

BACKGROUND OF THE INVENTION

This invention relates to a charge plate for use in a laminated coating head of the general type described in Beam et al U.S. Pat. No. 3,586,907. Coating heads of that type are used in ink jet printing systems, which create printed matter by selective charging, deflecting and catching of drops produced by one or more rows of continuously flowing ink jets. The jets themselves are produced by forcing ink under pressure through a series of orifices in an orifice plate, which is one component of the laminated head.

A stimulation arrangement stimulates the jets to break the ink up into uniformly sized and regularly spaced drops, with drop formation occuring in all jets at more or less fixed positions, all located approximately the same distance from the orifice plate. The charge plate is positioned within the coating head so as to achieve electrical charging of selected ones of the drops being generated.

A charge plate as taught in the Beam et al patent comprises a plate of dielectric material provided with a series of charging tunnels located equidistantly along a straight line. Each charging tunnel is coated with an electrically conductive material so as to define a cylindrical charging electrode. Electrical leads are connected to each such charge electrode, and the electrical leads in turn are activated selectively by an appropriate data processing system. Typical prior art charge plates including such electrodes are disclosed in Solyst U.S. Pat. No. 3,975,741, in Kuhn U.S. Pat. No. 3,984,843 and in Bassous et al U.S. Pat. No. 4,047,184. The prior art also includes charge plates having charging electrodes formed in notches along the edges of the plate, as disclosed in the above mentioned Solyst patent, and also in Robertson U.S. Pat. No. 3,604,980, Culp U.S. Pat. No. 3,618,858, and in Van Breemen et al U.S. Pat. No. 4,035,812.

A serious difficulty arises in the fabrication of a suitable charge plate because of a requirement that the charging tunnels be accurately positioned, located extremely close together, and have a very high length to diameter ratio. For a typical ink jet printer as used in the forms printing business, the charging electrodes may be arranged in two rows, with the electrodes in each row having a center-to-center spacing of about 0.423 mm. In order to accommodate jets the internal diameter of the charging electrodes may be about 0.355 mm. diameter, so that the bridge between electrodes is only 0.068 mm. thick. Moreover, in order to accommodate variations in the filament lengths of the jets, the charge plate must be at least about 1 mm. thick. This means that each of the tunnels has a length to diameter ratio in excess of 2.8. Depending upon the width of the area to be printed, there may be anywhere from several hundred to over one thousand such cylindrical electrodes, each of which must be located with highest accuracy in relation to a reference point on the plate.

Due to the close spacing of the tunnels and the high length to diameter ratio it has been extremely difficult to fabricate suitable charge plates. Drilling of the tunnels has been found to be extremely expensive and largely unsatisfactory in plate materials having sufficient rigidity for the present application. Casting has not been satisfactory, due to the poor dimensional stability of known casting materials suitable for this application.

The most satisfactory charge plate thus far used for such purposes has been photofabricated from a photosensitive ceramic material, which is exposed, etched, and thereafter fired to a final state. It has been found that the firing process causes dimensional alteration of the plate, so that most of the plates have to be rejected. Those plates which do pass inspection are in many cases marginally acceptable, and they are in any event quite delicate and easily damaged. Moreover it has been difficult to plate charge tunnels and electrical circuitry on such plates in a fully satisfactory manner.

SUMMARY OF THE INVENTION

This invention provides an improved, low cost, durable and dimensionally stable charge plate comprising a plastic support structure cast in place within an elongated slot extending medially along a rigid support plate. For producing the support structure, there is provided an elastomer mold comprising a base and a row of pins projecting outwardly from the base. The support plate is placed against the mold, with the medially extending slot peripherally surrounding the mold pins. In preferred embodiment the pins are coated with a suitable mold release material, overcoated with an electrically conductive epoxy and thereafter covered with a suitable casting resin. The casting resin is poured into and completely fills the support plate slot. After the resin has been cured, the mold is separated from the charge plate structure, with the conductive epoxy transferring to the surface of the newly cast structure. The conductive material which is so transferred defines a series of cylindrical charge electrodes, to which electrical leads are attached.

The rigid support plate provides durability and stabilizes the somewhat more flexible electrode support structure. The charge tunnels, which are cast within the electrode support structure, are near dimensional duplicates of a master from which the mold is produced. The master may be produced by any suitable means to meet whatever dimensional requirements may have been established and thereafter used to produce a series of elastomer molds. Each such elastomer mold may be used for casting a large number of charge plates, so that low cost, high volume and high yield production is possible.

It is therefore seen that the primary object of this invention is to produce an improved charge plate and a method for manufacturing the same. Other and further objects will be apparent from the accompanying specification, drawings and claims.

DESCRIPTION OF THE PREFERRED EMBODIMENTS

Figure 1:
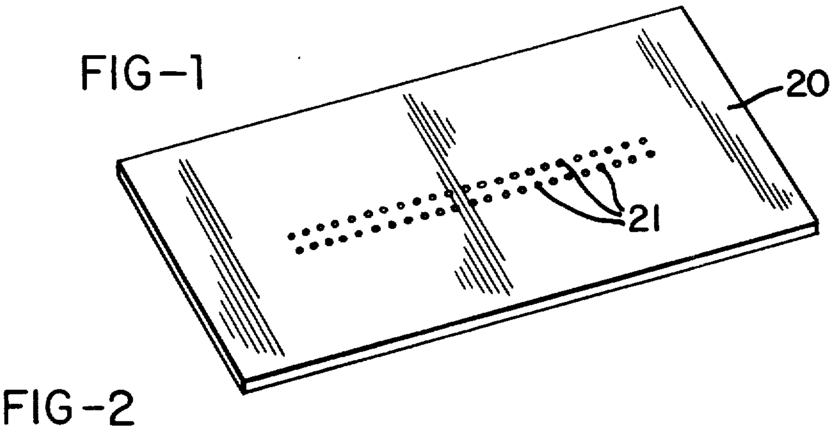
FIG. 1 is a perspective view of a charge plate master.

The preferred method for producing charge plates in accordance with this invention is illustrated in detail in FIGS. 1 through 14. The procedure begins by producing a charge plate master 20, which has a series of tunnels 21. The tunnels 21 are fabricated in the master 20 by any convenient process so as to have the configuration and positioning required for the charging electrodes of the finished product. Tunnels 21 may be drilled to exacting specification without regard for expense, because only one master need be made. Alternatively master 20 may be made in accordance with the prior art process for producing ceramic charge plates. In such an event master 20 is chosen from among a series of plates produced as a production lot and is the most accurate of the plates so produced. The tunnels of such a plate have a generally "hour glass" cross section, and this type of configuration is illustrated in the drawings.

Figure 2:
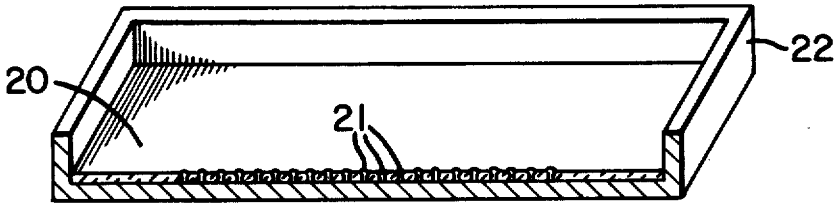
FIG. 2 is a cut away view of a fabrication fixture with a charge plate master in place.
Figure 3:
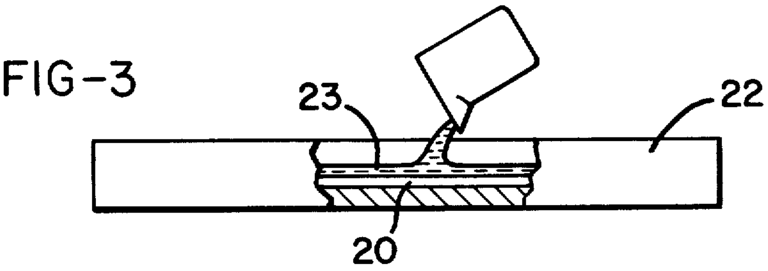
FIG. 3 illustrates the step of casting a mold.

Once the master has been completed, it is positioned within a fabrication fixture 22 as generally illustrated in FIG. 2. Fixture 22 includes an arrangement for clamping the master plate 20 in place. The clamping arrangement is of conventional design and is not illustrated.

Figure 4:
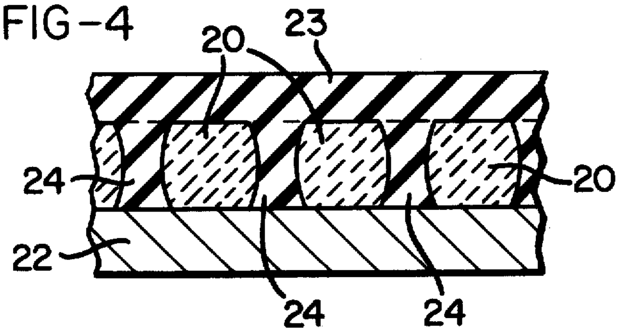
FIG. 4 is a cross-sectional view of an elastomer mold in place against a charge plate master.

After the master plate has been clamped in place within fixture 22, a cured silicone elastomer mold is prepared. Mold preparation is accomplished by pouring a suitable liquid silicone elastomer material into fixture 22, completely covering master plate 20 and filling the tunnels 21. Prior to pouring, the elastomer is evacuated in a vacuum chamber for removal of all air bubbles. Fixture 22, with the liquid elastomer in place, is placed in a vacuum chamber for a second evacuation to assure complete filling of all cavities within tunnels 21 of master plate 20. After pouring and evacuation, the elastomer is pressed in place using a glass plate. Thereafter, the liquid elastomer is air cured to produce a mold 23 having a cross section as illustrated in FIG. 4.

Figure 5:
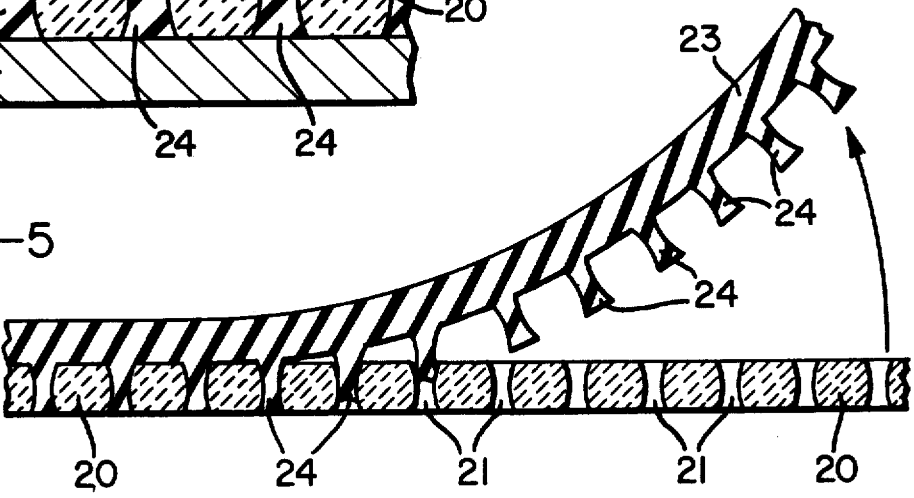
FIG. 5 illustrates separation of an elastomer mold from a charge plate master.

Mold 23 includes a series of pegs 24 configured in correspondence with the configuration of tunnel 21. In order to achieve separation of mold 23 from charge plate 20 is is desirable that mold 20 be quite elastic, an elongation capability of 100 percent being preferred. A suitable silicone elastomer for use in this application is SILASTIC brand J RTV elastomer sold by Dow Corning Corp. of Midland, Mich. A mold produced from such material is easily peeled or flexed away from master plate 20 as illustrated in FIG. 5.

Figure 6:
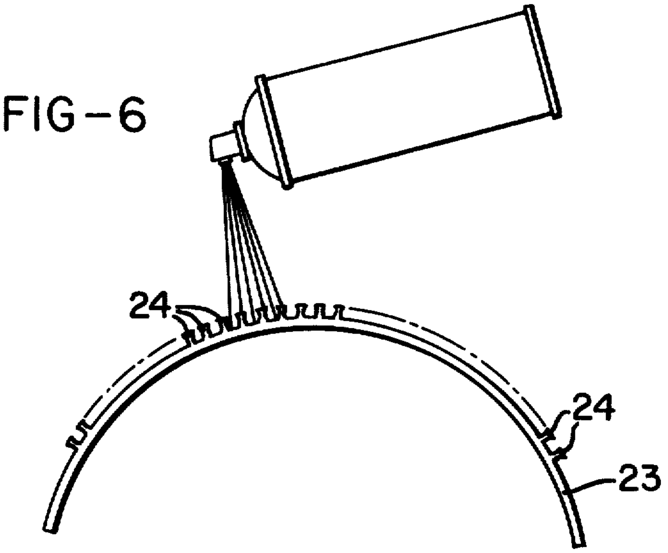
FIG. 6 illustrates the step of coating the pins of an elastomer mold with a conductive epoxy material.
Figure 7:
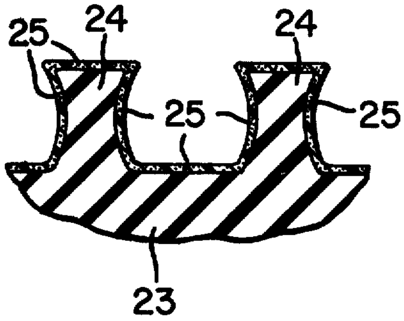
FIG. 7 is an enlarged cross-sectional view of mold pins with a conductive coating thereon.
Figure 8:
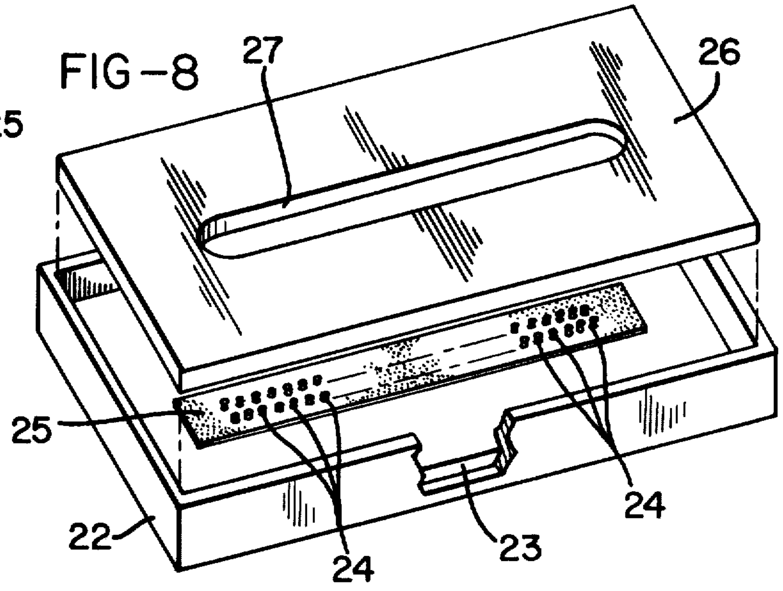
FIG. 8 illustrates the positioning of a support plate within a fabrication fixture.

After mold 23 has been removed from master plate 20, it is sprayed with a suitable mold release agent, such as Miller Stephanson MS-122 release agent sold by Miller Stephanson Chemical Company, Inc. of Danbury, Conn. The mold is then oversprayed with a suitable conductive epoxy such as ECR 4100 silver epoxy sold by Formulated Resins, Inc. of Greenville, Rhode Island. The epoxy mixture may be thinned with toluol for spraying. In order to assure uniform coverage of the surface area surrounding pegs 24, the mold is flexed during spraying, as indicated in FIG. 6. FIG. 7 illustrates two of the pegs 24, after they have been given a suitable coating of conductive epoxy 25. Preferably, mold 23 is masked around the area of pegs 24 during the spraying step, so that the coating 25 has a generally rectangular outline as best illustrated in FIG. 8.

Following coating of mold 23, the mold is returned to fixture 22 with pegs 24 standing upright (See FIG. 6). With the mold in this position, a support plate 26 is positioned thereagainst. Support plate 26 is made from rigid, durable material such as fiberglass board known in the trade as G-10 board. Support plate 26 has a medially extending elongated slot 27 for receiving the pegs 24.

Figure 9:
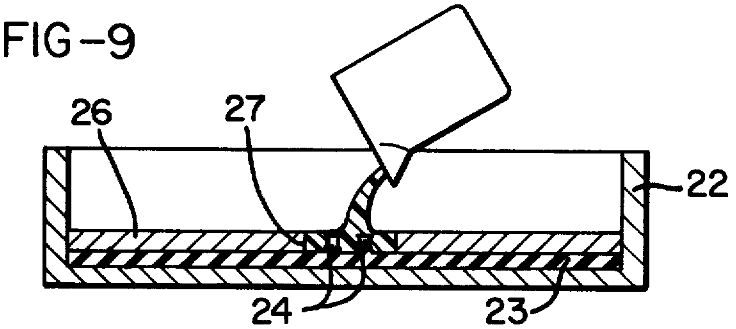
FIG. 9 illustrates the step of casting an electrode support structure.
Figure 10:
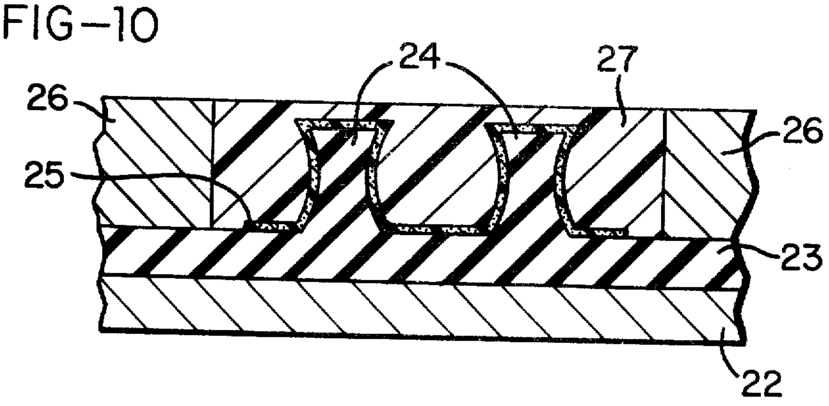
FIG. 10 is an enlarged cross-sectional view of a cured electrode support structure in place against a mold.

After support plate 26 has been placed within fixture 22 as above described, it is clamped in place. Thereafter slot 27 is filled with a suitable casting resin as illustrated in FIG. 9. The casting resin should have a relatively low viscosity and exhibit little shrinkage upon curing. One casting resin which has been found to be suitable is an epoxy resin comprising Bisphenol A and epichlorohydrin, which is sold by Emerson and Cuming, Inc. of Northbrook, Ill. under the name STYCAST 2057. This resin is mixed in a ratio of about 17 parts resin with one part of a modified aliphatic amine catalyst identified by Emerson and Cuming, Inc. as Catalyst 9. Prior to the casting step, the resin and catalyst mixture is placed in a vacuum chamber for evacuation of all air. The resin is preferably cured at a temperature of about 38° C. in order to control the dimensions of the finished product. An enlarged cross-sectional view of the product after curing of the resin is shown in FIG. 10, with the cured resin being illustrated generally at 27.

Figure 11:
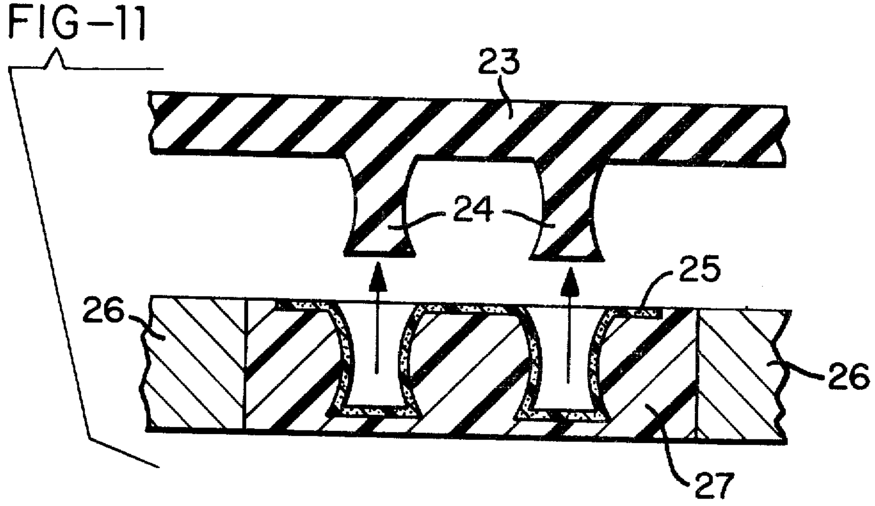
FIG. 11 illustrates the step of separating a mold from a charge plate structure.

The next step in fabrication of the charge plate is to remove mold 23 from fixture 22 and separate it from the intermediate charge plate structure as illustrated in FIG. 11. This separation is readily facilitated by the flexibility of mold 23 and by the tendency of the silicone elastomer material to have little adherence to the materials comprising the charge plate structure. Preferably the mold is flexed for removal in like manner as for the earlier separation from the charge plate master. Coating with the mold release agent, as above described, also facilitates the separation. At this time the conductive epoxy coating 25 transfers from the mold to the charge plate structure.

Figure 12:
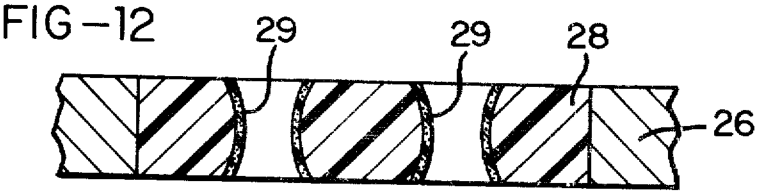
FIG. 12 is an enlarged cross-sectional view of a charge plate structure after finishing on both sides.

After the aforementioned separation, the charge plate is lapped or ground on both sides to produce a finished electrode support structure 28 supporting a series of electrodes 29, as illustrated in FIG. 12. It will be seen that electrodes 29 comprise the remains of the coating layer 25 after the above mentioned lapping step. It will be appreciated that electrodes 29 must extend completely through the charge plate structure and that lapping of resin region 27 and support plate 26 must be carried out to a sufficient extent to achieve this end. It will be readily apparent that support plate 26 may have a smaller initial thickness, so that pegs 24 extend above the surface of the support plate during the resin casting step. In such an event less lapping or grinding is required for arrival at the final configuration.

Figure 13:
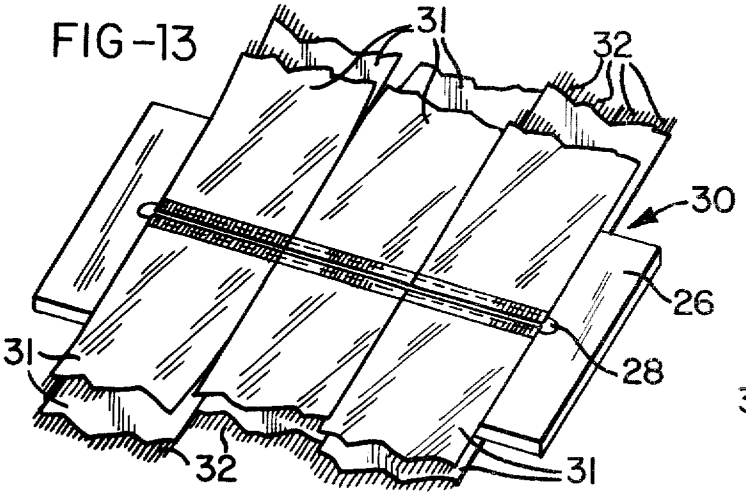
FIG. 13 is a pictorial drawing of a fully assembled charge plate.
Figure 14:
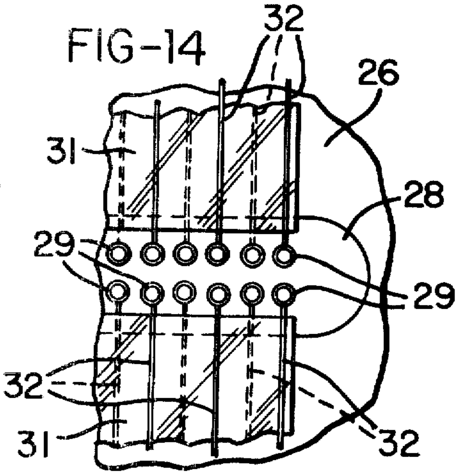
FIG. 14 is an enlarged view of a portion of a fully assembled charge plate.

Once the lapping has been completed, the charge plate structure is ready for attachment of flexible printed circuit leads. Preferably the lead wires are encapsulated in a polyimide film sold by E.I. du Pont de Nemours & Co., Inc. under the trademark KAPTON. FIG. 13 illustrates a completed charge plate 30 with twelve sets of cables 31 attached. Lead wires 32 of cables 31 are connected to electrodes 29 alternately on the front and back side of the structure, as best illustrated in FIG. 14.

It will be appreciated that electrode support structure 28 is intimately bonded to support plate 26, so that the support plate gives dimensional stability to the support structure 28, while at the same time giving great durability to the charge plate as a whole. Electrode support structure 28 is also intimately bonded to electrodes 29 as a result of the natural adherence between the casting resin and the conductive epoxy. Leads 32 may be attached to electrodes 29 by hand soldering process or by any suitable automated technique. As mentioned previously, it is desirable that electrodes 29 have a length of at least about 1 mm. in the axial direction in order to provide fully satisfactory drop charging. A length somewhat in excess of the 1 mm. figure is preferred and this is readily achieved in accordance with the practice of this invention.

While the method herein described, and the form of apparatus for carrying this material into effect, constitute preferred embodiments of the invention, it is to be understood that the invention is not limited to this precise method and form of apparatus, and that changes may be made in either without departing from the scope of the invention.

What is claimed is:

1. A charge plate for an ink jet printer comprising:

(a) a rigid support plate provided with a medially extending elongated slot, (b) a non-conductive plastic electrode support structure provided with a series of molded charge tunnels and cast in place adheringly against the walls of said slot, (c) charge electrodes adhered to the walls of said tunnels, and (d) electrical lead means attached to said electrodes.

2. A charge plate in accordance with claim 1 wherein said support plate is fabricated from fiberglass board.

3. A charge plate according to claim 1 wherein said charge electrodes have an axial dimension on the order of at least about 1 mm.

4. A charge plate according to claim 1 wherein said lead means are attached to said electrodes alternately on opposite sides of said electrode support structure.

5. A charge plate for an ink jet printer comprising:

(a) a rigid support plate provided with a medially extending elongated slot, (b) a non-conductive plastic electrode support structure provided with a series of molded charge tunnels having a thickness on the order of at least about 1 mm. and cast in place adheringly against the walls of said slot, (c) charge electrodes coated upon the walls of said tunnels, and (d) electrical lead means attached to said electrodes alternately on opposite sides of said electrode support structure.

6. A charge plate in accordance with claim 5 wherein said electrode support structure is a cured epoxy resin.

* * * * *